(12) United States Patent
Cowelchuk et al.

(10) Patent No.: US 7,357,444 B2
(45) Date of Patent: Apr. 15, 2008

(54) TUNABLE GEOMETRY FOR ENERGY ABSORBING FOAM TO LOWER PEAK LOAD DURING SIDE IMPACT

(75) Inventors: Glenn A. Cowelchuk, Chesterfield Tw., MI (US); David J. Dooley, Troy, MI (US); Charles Haba, Troy, MI (US)

(73) Assignee: International Automotive Components Group North America, Inc., Dearborn, MI (US)

(*) Notice: Subject to any disclaimer, the term of this patent is extended or adjusted under 35 U.S.C. 154(b) by 0 days.

(21) Appl. No.: 11/368,795

(22) Filed: Mar. 6, 2006

(65) Prior Publication Data
US 2007/0262612 A1 Nov. 15, 2007

(51) Int. Cl.
*B60J 5/00* (2006.01)

(52) U.S. Cl. .......................... 296/187.05; 296/146.15; 296/146.5; 296/146.7; 280/751; 188/376

(58) Field of Classification Search .......... 296/146.1, 296/146.5, 146.7, 1.04, 187.05; 280/751, 280/752; 188/371, 376, 377
See application file for complete search history.

(56) References Cited

U.S. PATENT DOCUMENTS

| | | | | |
|---|---|---|---|---|
| 3,989,275 A * | 11/1976 | Finch et al. | ................ | 280/751 |
| 4,272,103 A * | 6/1981 | Schmid et al. | ............... | 280/751 |
| 4,783,114 A | 11/1988 | Welch | | |
| 4,786,100 A | 11/1988 | Kleemann et al. | | |
| 5,098,124 A | 3/1992 | Breed et al. | | |
| 5,395,135 A | 3/1995 | Lim et al. | | |
| 5,433,478 A * | 7/1995 | Naruse | ....................... | 280/751 |
| 5,482,344 A * | 1/1996 | Walker et al. | ............. | 296/39.1 |
| 6,070,905 A * | 6/2000 | Renault | ...................... | 280/751 |
| 6,207,244 B1 * | 3/2001 | Hesch | ..................... | 296/146.6 |
| 6,447,047 B1 * | 9/2002 | Marcovecchio et al. | . | 296/146.7 |
| 6,475,937 B1 | 11/2002 | Preisler et al. | | |
| 6,547,280 B1 | 4/2003 | Ashmead | | |
| 6,550,850 B2 * | 4/2003 | Laborie et al. | .......... | 296/146.6 |
| 6,752,450 B2 | 6/2004 | Carroll, III et al. | | |
| 6,808,206 B2 | 10/2004 | Yata et al. | | |
| 6,808,224 B1 * | 10/2004 | Obara | ..................... | 296/146.5 |
| 6,955,391 B1 * | 10/2005 | Peng | ....................... | 296/146.6 |
| 7,097,234 B2 * | 8/2006 | Schonebeck | ........... | 296/187.03 |
| 2003/0184070 A1 * | 10/2003 | Vidal et al. | ................ | 280/752 |

FOREIGN PATENT DOCUMENTS

JP 2004338669 12/2004

* cited by examiner

*Primary Examiner*—Jason S. Morrow
(74) *Attorney, Agent, or Firm*—MacMillan, Sobanski & Todd, LLC

(57) ABSTRACT

An energy absorbing countermeasure for motor vehicle doors comprises a body having at least a first zone and a second zone. Each zone has at least one surface with recesses in the surface and portions between recesses. The portions are broken upon impact and enter into the recess to exhibit energy absorbing efficiency. The recesses in the first zone are arranged or configured to absorb a first desired peak load during impact and the recesses in the second zone are arranged or configured to absorb a second desired peak load during impact. The first desired peak load is different from the second desired peak load.

23 Claims, 4 Drawing Sheets

TUNABLE GEOMETRY FOR ENERGY ABSORBING FOAM TO LOWER PEAK LOAD DURING SIDE IMPACT

BACKGROUND OF INVENTION

The present invention generally relates to a countermeasure filling material for absorbing impact in a motor vehicle interior, particularly, in the passenger compartment of a motor vehicle. More particularly, the present invention relates to energy absorbing countermeasures for a motor vehicle.

In the event of a collision or impact, it is known to improve passenger safety by causing thrust to be exerted on the chest, abdomen, and/or pelvis of the passenger in a manner compatible with the passenger's anatomical characteristics. The object is to ensure that the contact between the passenger and the motor vehicle door does not occur at the level of passenger's trunk that constitutes a region weaker than that of the passenger's chest, abdomen, and/or pelvis.

For this purpose, it is known to fill the interior of the door, the interior of the door trim panel, or other interior component with a filling material tailored to the compression. In this way, upon impact, the deformation of the outer skin compresses the filling material. This compression is transmitted to the trim panel, which consequently has a tendency to penetrate the passenger compartment right at the start of deformation from the collision. The trim panel comes in contact with the passenger's chest, abdomen, and/or pelvis and exerts a thrust on the chest, abdomen, and/or pelvis.

In order to avoid injuring the passenger, the filling material must have a limited resistance to compression so that the resulting force is compatible with the resistance of the torso of a standard person. For example, this force must be less than the force exerted on the torso of a dummy as tolerated by Federal Motor Vehicle Safety Standard (FUSS) 214, which relates to lateral shocks or side impacts.

The U.S. Department of Transportation (DOT) National Highway Traffic Safety Administration (NHTSA) has proposed a major regulatory revision of FMVSS 214 concerning passenger impact protection. Manufacturers will also have to meet an additional performance test involving a 20-mph vehicle side impact into a rigid pole at an approach angle of 75 degrees. In NHTSA's opinion, the new pole test more accurately reflects real world side-impact collisions in which head injuries are prevalent. Other dangerous side-impact crashes often happen when a large vehicle strikes a smaller one at an intersection. NHTSA estimates a car passenger is 63.5 times more likely to die if the passenger's vehicle is struck by a pickup or SUV. A new, more technically advanced dummy representing an adult male of average height, and, for the first time, a dummy representing a small adult female (4'11"), would be used in side-impact performance testing. These new dummies will promote the development of head and thorax protection systems for a wider segment of the population.

This presents a problem because the filling material must have a limited resistance to compression so that the resulting force is compatible with the resistance of the torso of two different standards, namely, the adult male of average height and the small adult female.

The present invention is directed towards an energy absorbing countermeasure for motor vehicles that comprises a body having at least a first zone and a second zone. Each zone has at least one surface with recesses in the surface and portions between recesses. The portions are broken upon impact and enter into the recess to exhibit energy absorbing efficiency. Alternatively, the portions are merely configured to enter into the recesses upon impact. The recesses in the first zone are arranged or configured to absorb a first desired peak load during impact and the recesses in the second zone are arranged or configured to absorb a second desired peak load during impact. The first desired peak load is different from the second desired peak load.

DETAILED DESCRIPTION

Figure 1:
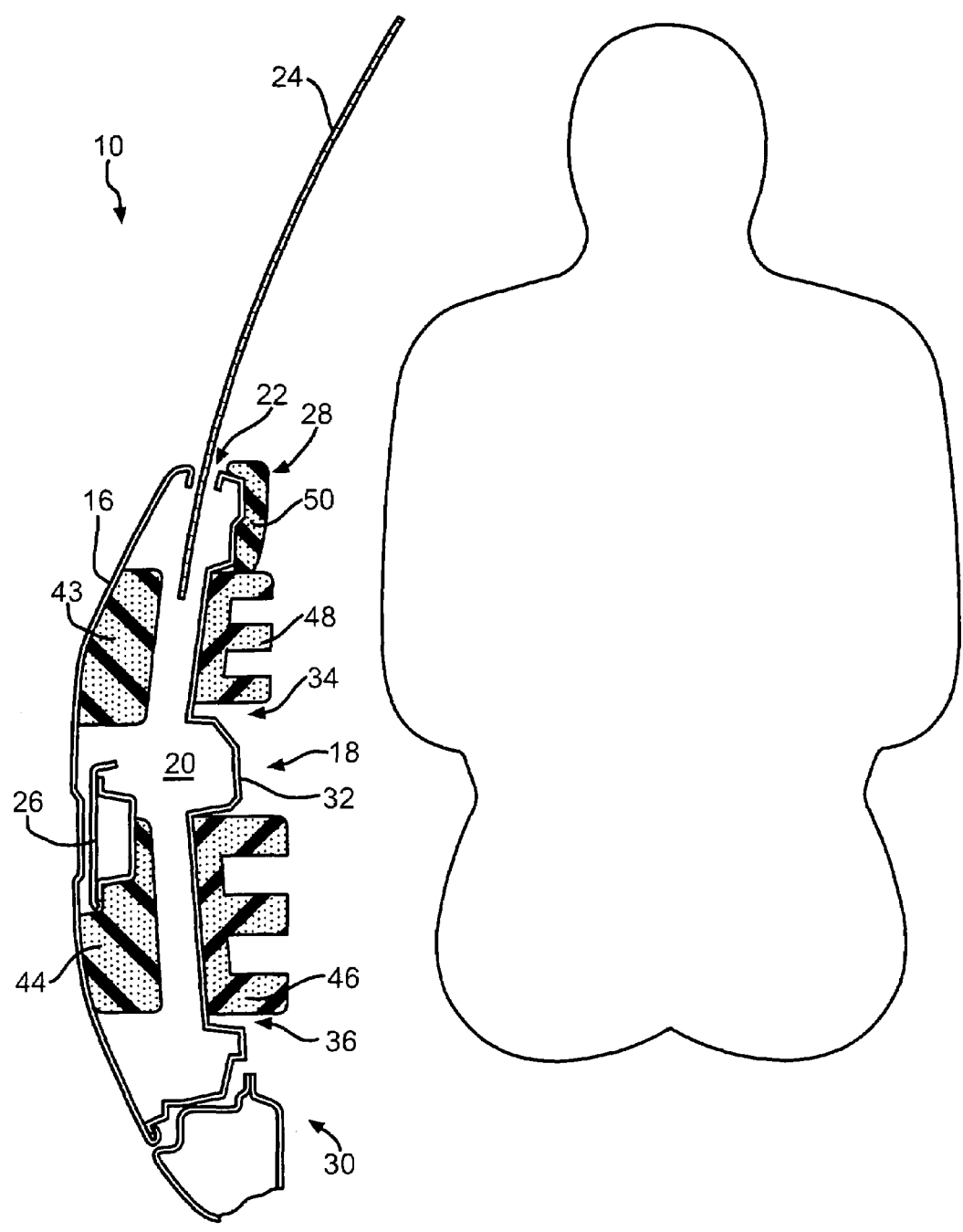
FIG. 1 is a cross-sectional view in side elevational of a motor vehicle door with an energy absorbing countermeasure filling material illustrated in operational relationship with a passenger.

Referring now to the drawings, there is illustrated in FIG. 1 a cross-sectional view of a motor vehicle door 10 with an energy absorbing countermeasure filling material in operational relationship with a passenger. It should be appreciated that the door 10 is moveable and connected to the motor vehicle, as is known in the art. Although the filling material is illustrated in connection with a motor vehicle door 10, it should be appreciated that the filling material could be used in any suitable manner in connection with other motor vehicle components.

The motor vehicle door 10 includes an outer panel 16 and an inner panel, generally indicated at 18, joined together and forming a space 20 therebetween. The door 10 also includes an opening 22 at an upper end for passage of a window 24 therethrough. The window 24 may move in and out of the space 20 as is known in the art. The door 10 further includes an intrusion or door guard beam 26 extending longitudinally in the space 20 between the outer and inner panels 16, 18 and is secured therein in a suitable manner, such as hem-flanging and/or welding. It should be appreciated that the door 10 may include a window regulator device, door latch, and other components of a motor vehicle door, as known in the art.

The inner panel 18 has an upper end 28, lower end 30, and an arm rest portion 32 disposed therebetween. The inner panel 18 also has an upper recess 34 located between the upper end 28 and arm rest portion 32 and a lower recess 36 located between the lower end 30 and arm rest portion 32. The recesses 34, 36 are generally rectangular in shape. It should be appreciated that the inner panel 18 may include additional recesses and that the recesses 34, 36 may be located longitudinally along the vehicle door 10.

The motor vehicle door 10 also includes a door trim panel (not shown) mounted on the inner panel 18 to form a space therebetween. The door trim panel may be mounted on the inner panel 18 in a suitable manner, such as fasteners (not shown). The door trim panel may include an arm rest (not shown). The door trim panel has an upper aperture corresponding to the upper recess 34 and a lower aperture corresponding to the lower recess 36. It should be appreciated that the door trim panel may include additional apertures or enlarged apertures corresponding to one or more recesses in the inner panel 18.

Preferably, the outer panel 16 and inner panel 18 are made of a metal material. The door trim panel is made of a suitable material, such as plastic, cloth, vinyl, leather, carpeting, cardboard, woodstock, or a combination thereof. It should be appreciated that the outer panel 16, inner panel 18 and door trim panel may be made of other suitable materials.

The motor vehicle door 10 further includes at least one, preferably a plurality of countermeasure filling materials, or energy absorbing countermeasures 43, 44, 46, 48, 50, according to the present invention. The energy absorbing countermeasures 43, 44, 46, 48, 50 are preferably formed from foam material blocks. The foam material is preferably polyurethane foam, although other materials may be suitable. The energy absorbing countermeasures 43, 44, 46, 48, 50 are generally rectangular in shape and have a desired density to provide a desired crush strength. It should be appreciated that the overall shape of the energy absorbing countermeasures 43, 44, 46, 48, 50 may have any suitable shape, such as oval, quadrilateral, and other suitable shape. Although the countermeasures 43, 44, 46, 48, 50 are illustrated in a particular arrangement and supported in connection with a motor vehicle door 10, it should be appreciated that the countermeasures 43, 44, 46, 48, 50 may be arranged and supported in any suitable manner in connection with the motor vehicle door 10, or other component part.

As illustrated in the drawings, the energy absorbing countermeasures 43 and 44 are disposed in the space 20 and mounted to the outer panel 16 in a suitable manner, such as an adhesive, for example, like a urethane adhesive. The energy absorbing countermeasure 43 is located between the intrusion beam 26 and aperture 22. The energy absorbing countermeasure 44 is located between the intrusion beam 26 and a lower end of the vehicle door 10. The energy absorbing countermeasures 46, 48 are disposed in the recesses 34, 36, respectively, of the inner panel 18. The energy absorbing countermeasures 46, 48 are mounted to the door trim panel (not shown) in a suitable manner, such as an adhesive, as previously described. The energy absorbing countermeasures 46, 48 protract through the apertures, respectively, in the door trim panel and into the passenger compartment of the vehicle. The energy absorbing countermeasure 50 is disposed in the space 40 near the upper end 28 of the inner panel 18. The energy absorbing countermeasure 50 is mounted to the door trim panel in suitable manner, such as an adhesive, as previously described. It should be appreciated that the energy absorbing countermeasure 50 may be trapped between the inner panel 18 and door trim panel.

In operation, the motor vehicle door 10 may be subject to a collision or impact. When this occurs, displacement of the outer panel 16 and intrusion beam 26 causes displacement of the inner panel 18. As a result, the energy absorbing countermeasures 43, 44, 46, 48, 50 move independently of each other toward the passenger in the passenger compartment. The displacement of the outer panel 16 and intrusion beam 26 pushes the energy absorbing countermeasures 43, 44, 46, 48, 50 into the passenger compartment for cushioning. The energy absorbing countermeasures 43, 44, 46, 48, 50 are preferably of different crush strengths, shapes, and thicknesses for protection of the chest, pelvis and leg region of the passenger. It should be appreciated that the inner panel 18 provides a reaction surface to move the entire energy absorbing countermeasure and protect the energy absorbing countermeasure from local denting.

Figure 2:
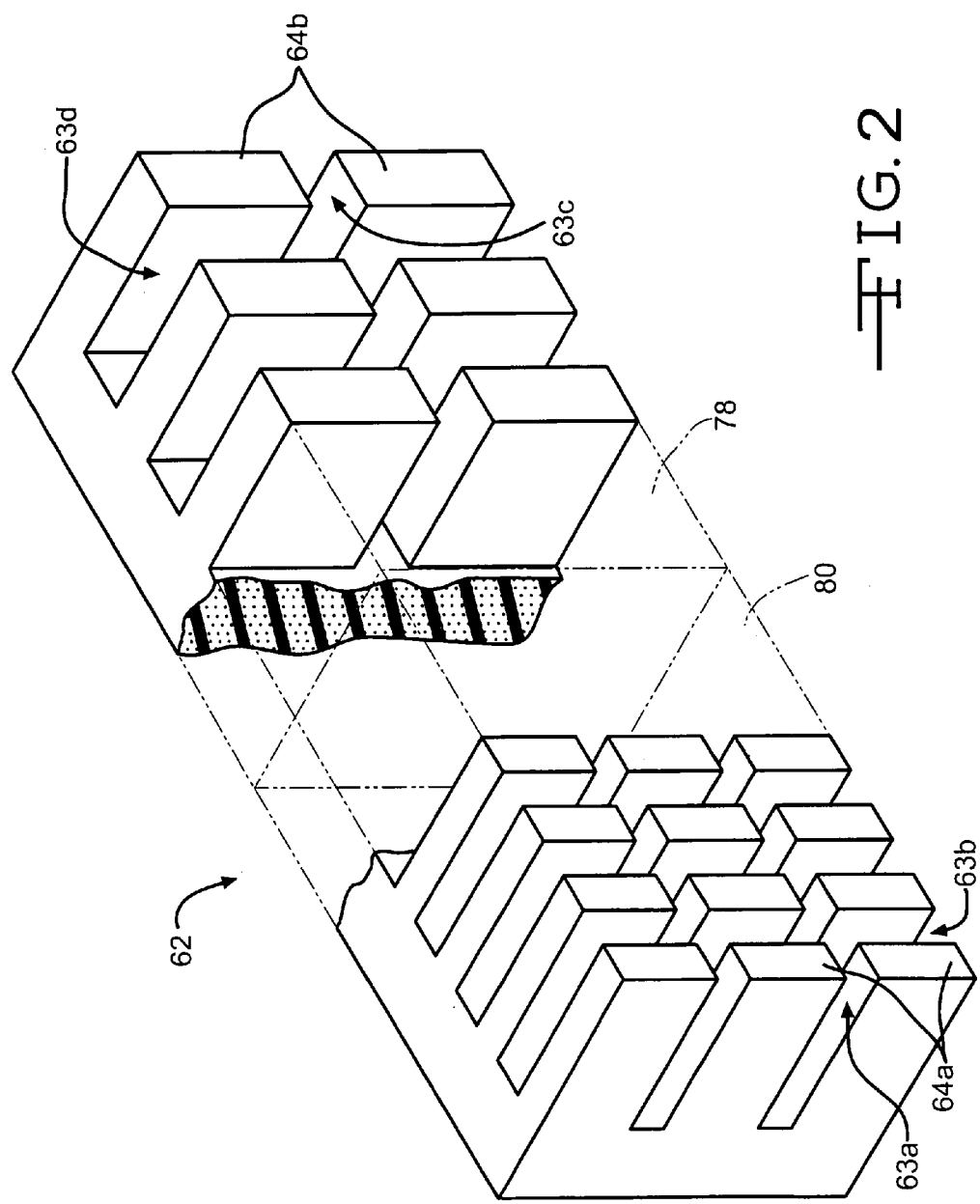
FIG. 2 is an isometric view of the filling material of FIG. 1 broken to show an indeterminate length and divided into two zones by phantom lines.

An energy absorbing countermeasure according to the present invention, as shown in FIG. 2, may be comprised of a body 62 formed of foam or any other suitable material, such as but not limited to a block made of rigid polyurethane foam or other suitable foam material, with one or more recesses 63a-63d in or on at least one surface of the body 62. The recesses 63a-63d may take on a variety of shapes, depending on peak load desired during impact, which in turn depends on the passenger type, whether it be the adult male of average height or the small adult female. The recesses 63a-63d are arranged adjacent to each other. A portion 64a, 64b stands between the adjacent recesses 63a-63d. The portion 64a, 64b is preferably solid. When broken by impact, the portion 64a, 64b enters into the recess 63a-63d, thereby exhibiting excellent energy absorbing efficiency. Alternatively, the portions 64a. 64b can be configured to enter into the recesses upon impact. The portion 64a, 64b may be in the form of rigid polyurethane foam or other suitable material.

Figure 3:
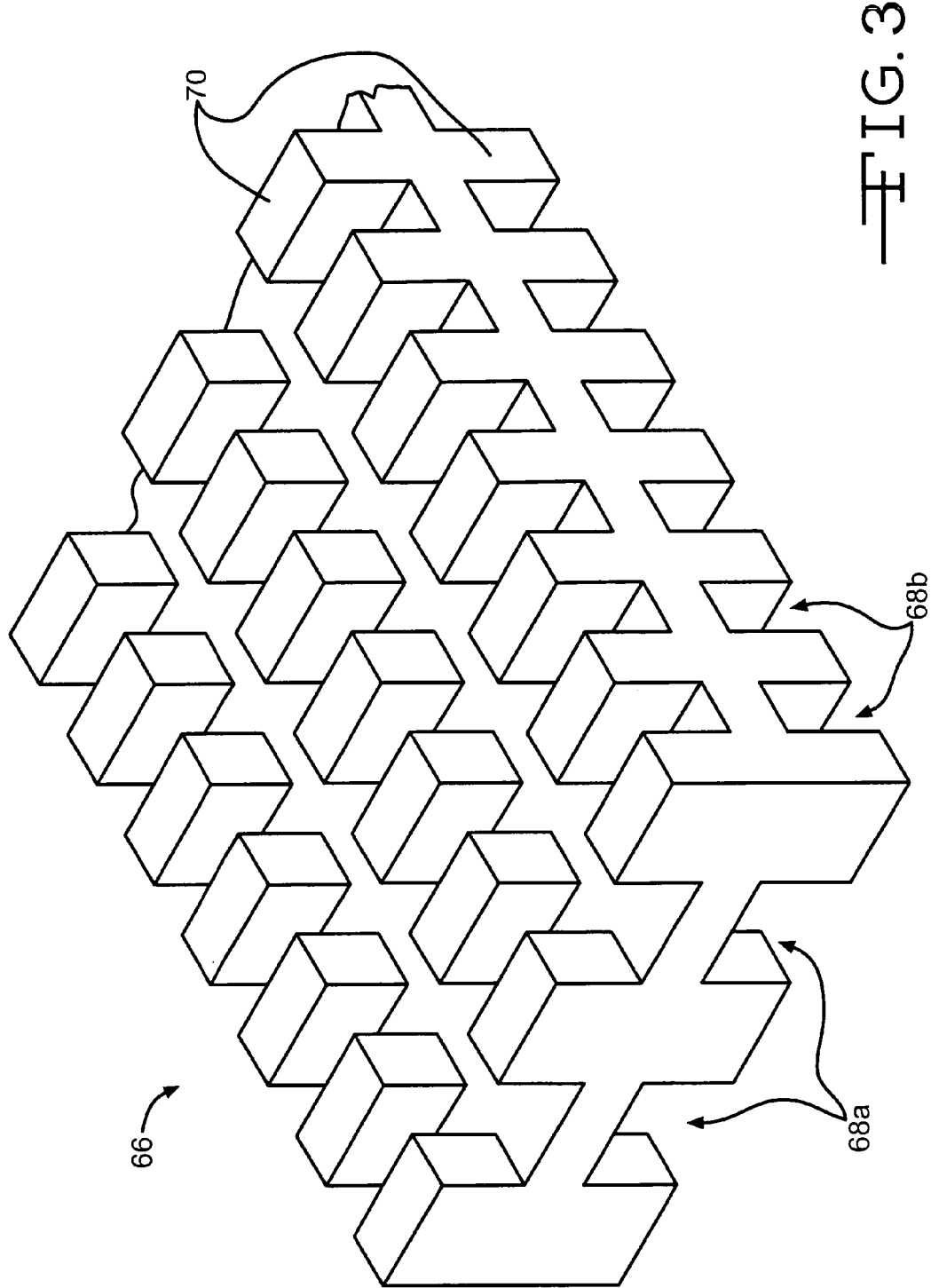
FIG. 3 is a partial isometric view of an alternative filling material.

An energy absorbing countermeasure, as partially shown in FIG. 3, maybe comprised of a body 66 in the from of a block with one or more recesses 68a, 68b on both surfaces of the body 66. The recesses 68a, 68b may have a similar shape to the recesses 63a-63d of the energy absorbing countermeasure shown in FIG. 2 and described above and may have a smaller depth. Also, in this energy absorbing countermeasure, portions 70 between the adjacent recesses 68a, 68b are broken by impact and the broken portions enter into the recesses 68a, 68b, thereby exhibiting excellent energy absorbing efficiency. Alternatively, the portions 70 can be configured to enter into the recesses upon impact. The portions 70 may be in the form of rigid polyurethane foam or other suitable material.

The portions 70 are preferably solid and may take on a variety of shapes, depending on peak load desired during impact, which in turn depends on the passenger type, whether it be the adult male of average height or the small adult female. The portion 70 are arranged in rows in a first direction, or the vertical direction of the body 66, and in columns in a second direction, or the longitudinal direction of the body 66. In the illustrated embodiment, the portions 70 are arranged in three rows and in seven columns, although the portions 70 may be arranged in other suitable manners. Also, in this energy absorbing countermeasure, the portions 70 may be formed of rigid polyurethane foam or other suitable material with recesses 68 therebetween.

Figure 4:
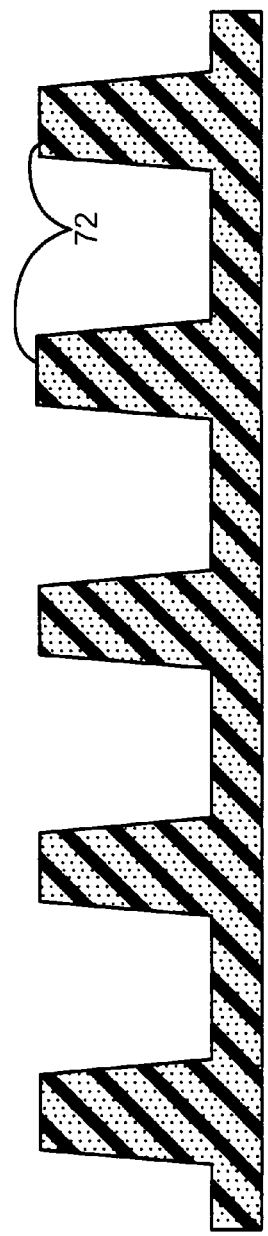
FIGS. 4-6 are cross-sectional views of alternative filling materials.
Figure 5:
Figure 6:
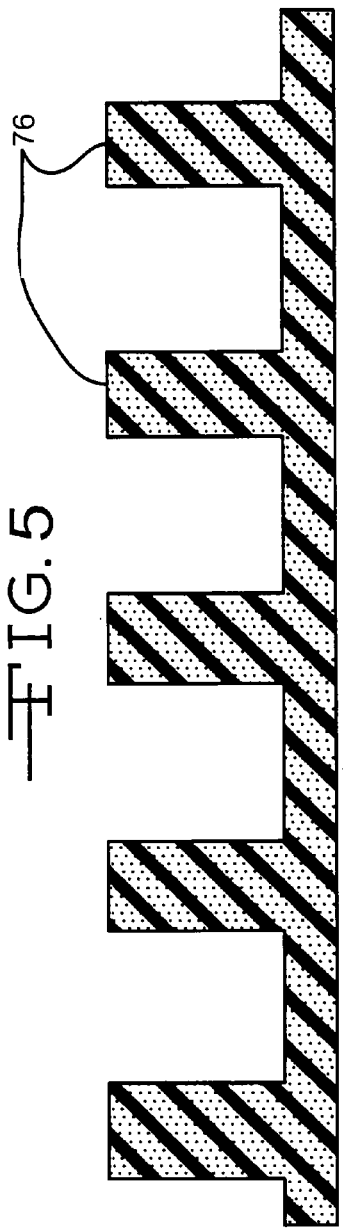

The portions may be any suitable shape, including but not limited to cubical, conical or spherical shapes, such as a square or rectangular shape, a frustrum shape (i.e., a square or rectangular clipped pyramid shape), a cylindrical shape, or a frusto-conical shape (i.e., the shape of a cone with its top cut off parallel to its base). Exemplary portions 72, 74, 76 are shown in cross-section in FIGS. 4-6. The overall shape of the foam block is preferably rectangular or egg shaped, although the invention may be practiced with other suitable shapes. Although pillars are shown, it should be appreciated that the invention may be practiced with other configurations, including but not limited ribs.

The energy absorbing countermeasure may be formed from any suitable material, such as, for example, expanded polypropylene or polyurethane foam, with 2.5 pounds per cubic foot (PCF) polyurethane foam performing well in a test environment.

GECET™ foam, which is a product of FOAM FABRICATORS, a corporation in Scottsdale, Ariz. (USA), is a suitable foam material. GECET foam products are a blend of polystyrene and polyphenylene oxide (PS/PPO). GECET performance resin, energy management foams are suitable for safety applications, like motor vehicle side impact protection. GECET expandable engineering resins are high performance foamed polymers offering exceptional impact energy management and other superior physical properties at elevated temperatures. GECET resins may be molded in a wide range of densities that enable energy absorbing countermeasure to be custom tailored for specific applications.

Another material suitable for forming the energy absorbing countermeasure is Strandfoam™ EA600, a product by DOW AUTOMOTIVE, located in Auburn Hills, Mich. (USA). STRANDFOAM is a strong, low-density, high energy-efficient polypropylene foam suitable for use in energy absorbing automotive applications. It has a unique honeycomb structure and a strand orientation that offers superior energy absorption with minimal displacement as well as excellent acoustical performance. It is bondable, solvent-resistant, recyclable and available in a variety of designs and sizes to meet design or packaging requirements.

The energy absorbing countermeasure may be any suitable thickness, although a baseline thickness of about 5 mm for Noise, Vibration and Harshness (NVH) shoddy and about 5 mm clearance between the inner panel 18 or door trim panel should provide acceptable results.

Molding geometry into the foam block reduces force from side impact. In particular, molded in recesses with tunable width, with an optimal width of about 50 mm, and angle, with an optimal angle of about 90 degrees, have proven to significantly reduce force from side impact. Although any suitable molded in geometry may be used, geometry cut out depth in a range of about 10 mm to about 25 mm and cut out width in a range of about 20 mm to about 55 mm, with a wall slope in a range of about 0.5 to 1.0, may be most suitable for carrying out the invention. These molded in features help aid in reducing the cost and weight of the energy absorbing countermeasure through foam material mass reduction.

Results of experiments with foam geometry optimization are set forth in U.S. Pat. No. 6,808,206, issued Oct. 26, 2004, to Yata et al., the disclosure of which is incorporated herein by reference.

Energy absorbing countermeasures according to the present invention comprise blocks, preferably foam blocks, with recesses (i.e., cut outs) and formations (i.e., pillars) that are arranged, spaced, dimensioned, and configured to in a manner to meet proposed regulatory revision of FUSS 214 concerning passenger impact protection. That is to say, the blocks may have first portion or zone 78 that is suitable to meet performance tests with dummies representing the adult male of average height and a second portion or zone 80 that is suitable to meet performance tests with dummies representing the small adult female. This is accomplished by tuning the first portion or zone 78 (i.e., rear portion) of the block to offer more resistance to impact by the passenger during a side impact and the second portion or zone 80 (i.e., forward portion) of the block to offer less resistance to impact by the passenger (i.e., a small adult female) during a side impact.

It should be appreciated that by making the formations, pillars, or ribs 64b thicker, as shown in FIG. 2, more energy can be absorbed in the beginning of a side impact. Adding formations, pillars, or ribs 64a could lower the maximum load force.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An energy absorbing countermeasure for motor vehicle doors comprising a foam body having at least first and second zones each with at least one surface with recesses in the surface and portions standing between recesses, the portions being configured to be broken upon impact and enter into the recesses to exhibit energy absorbing efficiency, the recesses in the first zone being arranged or configured to absorb a first desired peak load during impact and the recesses in the second zone being arranged or configured to absorb a second desired peak load during impact, the first desired peak load being different from the second desired peak load.

2. The countermeasure of claim 1 wherein the body is in the form of a block made of rigid polyurethane foam.

3. The countermeasure of claim 1 wherein the portion standing between adjacent recesses is solid.

4. The countermeasure of claim 1 wherein the body has a second surface with recesses in the second surface and portions between the recesses are broken by impact and enter into the recesses.

5. The countermeasure of claim 1 wherein the portions are arranged in rows in a vertical direction of the body and in columns a longitudinal direction of the body.

6. The countermeasure of claim 1 wherein the portions are at least one of cubical, conical or spherical shaped, square or rectangular shaped, frustum shapes, cylindrical shaped, or frusta-conical shaped.

7. The countermeasure of claim 1 wherein the body has an overall shape that is at least one of rectangular or egg shaped.

8. The countermeasure of claim 1 wherein the portions are at least one of pillars or ribs.

9. The countermeasure of claim 1 wherein the body is covered with a covering material.

10. The countermeasure of claim 1 wherein the recesses are molded into the body.

11. The countermeasure of claim 1 wherein the portions in the first zone are thicker or spaced further apart than the portions in the second zone.

12. An energy absorbing countermeasure for motor vehicle doors comprising a body having at least first and second zones each with at least one surface with recesses in the surface and portions standing between recesses, the portions being arranged in rows in a vertical direction of the body and in columns a longitudinal direction of the body, the portions further being configured to be broken upon impact and enter into the recesses to exhibit energy absorbing efficiency, the recesses in the first zone being arranged or configured to absorb a first desired peak load during impact and the recesses in the second zone being arranged or configured to absorb a second desired peak load during impact, the first desired peak load being different from the second desired peak load.

13. The countermeasure of claim 12 wherein the body is a foam body.

14. The countermeasure of claim 12 wherein the body is in the form of a block made of rigid polyurethane foam.

15. The countermeasure of claim 12 wherein the portion standing between adjacent recesses is solid.

16. The countermeasure of claim 12 wherein the body has a second surface with recesses in the second surface and portions between the recesses are broken by impact and enter into the recesses.

17. The countermeasure of claim 12 wherein the portions are at least one of cubical, conical or spherical shaped, square or rectangular shaped, frustum shapes, cylindrical shaped, or frusta-conical shaped.

18. The countermeasure of claim 12 wherein the body has an overall shape that is at least one of rectangular or egg shaped.

19. The countermeasure of claim 12 wherein the portions are at least one of pillars or ribs.

20. The countermeasure of claim 12 wherein the body is covered with a covering material.

21. The countermeasure of claim 12 wherein the recesses are molded into the body.

22. The countermeasure of claim 12 wherein the portions in the first zone are thicker or spaced further apart than the portions in the second zone.

23. A motor vehicle door comprising:
an outer panel;
an inner panel joined to the outer panel; and
a countermeasure filling material supported one of the outer panel and the inner panel, the countermeasure filling material including a body having at least first and second zones each with at least one surface with recesses in the surface and portions standing between recesses, the portions being arranged in rows in a vertical direction of the body and in columns a longitudinal direction of the body, the portion further being configured to enter into recesses to exhibit energy absorbing efficiency, the recesses in the first zone being arranged or configured to absorb a first desired peak load during impact and the recesses in the second zone being arranged or configured to absorb a second desired peak load during impact, the first desired peak load being different from the second desired peak load.

* * * * *